(12) United States Patent
Adolfsson (10) Patent No.: US 6,823,395 B1
(45) Date of Patent: Nov. 23, 2004

(54) ARRANGEMENT AND METHOD RELATING TO ROUTING IN A NETWORK

(75) Inventor: Lars Adolfsson, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 828 days.

(21) Appl. No.: 09/661,625

(22) Filed: Sep. 14, 2000

(30) Foreign Application Priority Data

Sep. 14, 1999 (SE) .............................................. 9903260

(51) Int. Cl.[7] .............................................. G06F 15/16
(52) U.S. Cl. ...................................... 709/242; 370/235
(58) Field of Search ................................ 709/236–245; 707/2, 3, 6, 10; 370/229–236

(56) References Cited

U.S. PATENT DOCUMENTS

| 5,128,926 | A | * | 7/1992 | Perlman et al. | ............. | 370/248 |
| 5,241,682 | A | * | 8/1993 | Bryant et al. | ............... | 709/249 |
| 5,423,002 | A | * | 6/1995 | Hart | ........................... | 709/249 |
| 5,541,911 | A | * | 7/1996 | Nilakantan et al. | ......... | 370/422 |
| 5,654,958 | A | * | 8/1997 | Natarajan | .................... | 370/410 |
| 5,687,168 | A | * | 11/1997 | Iwata | ......................... | 370/255 |
| 5,881,246 | A | * | 3/1999 | Crawley et al. | ............. | 709/238 |
| 5,987,521 | A | * | 11/1999 | Arrowood et al. | .......... | 709/239 |
| 6,078,590 | A | * | 6/2000 | Farinacci et al. | ............ | 370/432 |
| 6,098,107 | A | * | 8/2000 | Narvaez-Guarnieri et al. | ... | 709/239 |

FOREIGN PATENT DOCUMENTS

EP                0 753 952              1/1997

\* cited by examiner

*Primary Examiner*—Marc D. Thompson (57) ABSTRACT

Apparatus, system and method for managing and monitoring the routing in a communications network is presented. The network includes a number of routing domains which in turn include a number of routing areas, each having a number of network nodes that intercommunicate using transmission links. A link state routing process is implemented in each of the routing areas. A link state database is maintained by each network node for each routing area to which the network node belongs. In addition, at least for some of the routing areas include a routing controlling device which belongs to the link state routing process of the respective area, and which maintains a link state database for the routing area that is identical to that which is maintained by the network nodes. Each routing controlling device is connected to at least one network node of the respective area and provides for the rejecting of non-routing information and traffic to the controlling device and for the injecting of routing information into the link state routing process of the respective routing area from the routing controlling device.

23 Claims, 4 Drawing Sheets

| FROM | TO | LINK ID | METRIC |
|------|------|---------|--------|
| RO11 | RO12 | L1 | 5 |
| RO11 | RO14 | L2 | 2 |
| RO12 | RO11 | L1 | 3 |
| RO12 | RO14 | L3 | 4 |
| RO13 | RO14 | L4 | 2 |
| RO14 | RO11 | L2 | 3 |
| RO14 | RO12 | L3 | 4 |
| RO14 | RO13 | L4 | 4 |

Fig. 4

| DEST | NEXT HOP | METRIC |
|------|----------|--------|
| RO12 | DIRECT | 5 |
| RO13 | RO4 | 6 |
| RO14 | DIRECT | 2 |

ARRANGEMENT AND METHOD RELATING TO ROUTING IN A NETWORK

This application claims priority under 35 U.S.C. §§ 119 and/or 365 to Application No. 9903260-9 filed in Sweden on Sep. 14, 1999; the entire content of which is hereby incorporated by reference.

BACKGROUND

The present invention relates to an arrangement for managing/monitoring routing in a communications network, comprising a routing domain within a number of routing areas containing network nodes communicating via transmission links, which implements link state routing. The invention also relates to a routing controlling device for controlling routing in a routing area in a network implementing link state routing at least for that part (area) of the network. The invention also relates to a method of controlling routing within a routing area implementing link state routing. By controlling is here meant managing and/or monitoring.

Through routing a path through a network is determined. This can be done in different manners. Generally the monitoring and the management of the routing process is performed through direct communication with all network nodes which are associated with the routing process. According to one known solution this is done through actual login on each network element and retrieval of information. This is disadvantageous since each network node has to be contacted which means that network resources will be required which means that bandwidth as well as CPU (Central Processing Unit) power is demanded within the network nodes which is disadvantageous since preferably bandwidth as well as CPU power are scarce resources which should be used, to an extent which is as high as possible, for actual traffic handling. Another disadvantage consists in that the actual login on each network node generally is slow and different procedures are needed for different kinds of network nodes, for example different procedures are required for different manufactures of network nodes.

Alternatively remote monitoring may be implemented. Then may for example the SNMP (Simple Network Management Protocol) be used.

This is for example described in RFC 1157. This is however slow due to the fact that network nodes treat SNMP messages with the low priority as compared to other messages relating to other functions. A particular issue relates to Internet routing. Routing is a process used by Internet hosts for delivery of packets. Internet uses a hop-by-hop routing model which means that each host or router handling a packet examines the destination address in an IP header, computes the next hop address which will bring the packet one step closer to its destination and delivers the packet to the next hop address. There the above mentioned process is performed over again. A routing table is then required for matching destination addresses with next hops and routing protocols determine the contents of the tables. One particular kind of a routing protocol is a link-state routing protocol. Such a protocol requires each router to maintain at least a partial map of the network. When a link in the network changes its state (up to down or vice versa), a notification called a Link State Advertisement (LSA) is flooded throughout the network. This means that all the network nodes, in the case of Internet routers, note the change and in agreement therewith compute the routes. Examples on Internet links state routing protocols are OSPF (Open Shortest Path First) and IS—IS (OSI, Open Systems Interconnection). OSPF version 2 is for example described in RFC 1583. OSPF uses small so called hello packets for verification of link operations without transferring large tables. According to OSPF the routing domain is divided into different routing areas comprising a backbone area which divides interior routing into two levels and if inter area traffic is required, the packets are first routed to the backbone which is such may cause non-optimal routes since the inter area routing is not carried out until the packet reaches the backbone.

Link state routing of Internet means that each router has to find out which its neighbours are and obtain information about their addresses, measure the delay or the cost to each of said neighbours, construction of a packet with the above mentioned information which packet is to be sent to all the other routers and computation of the shortest path to all the other routers.

In addition to the hop-by-hop model another model is known which is denoted "source based routing". The difference is that, the route that a packet should take through a network is determined at the network ingress point and not like in the hop-by-hop model where it is determined at every node that the packet traverses. This model is used e.g. in ATM and PNNI.

U.S. Pat. No. 5,687,168 for example describes link-state routing in an ATM communication system. A link-state routing device is here used to reduce the amount of link state information that is exchanged in the network irrespectively of the number of links connecting adjacent switches. An abstracted link a plurality of links are virtually aggregated to generate a link state with respect to the abstracted link uniting link state information of a plurality of links. The link state update protocol portion has link topology the information synchronized on the network through distribution of the abstracted link-state information with the flooding mechanism. Because of the fact that the abstracted link represents a plurality of links, the amount of information to be distributed can be reduced. However, this document discloses no solution to the above mentioned problems.

SUMMARY

What is needed it is therefore an arrangement as referred to above for managing/monitoring routing in a communications network comprising a number of routing domains in turn comprising a number of routing areas with a number of network nodes which communicate via transmission links. Each routing domain is administrated as one unit by administrating means and link state routing is implemented through which the management, which may comprise monitoring and/or managing of new situations on transmission links within the network, in an efficient, reliable and cheap manner, can be provided. An arrangement is also needed through which routing monitoring/management can be handled in such a manner that bandwidth can be saved both generally in the network and for the respective network nodes and through which CPU power can be saved for the respective network nodes. An arrangement is also needed through which routing managing and monitoring can be handled in a fast manner as well as independently of kind of network node, manufacturer of network node etc.

Therefore is also a routing controlling device for managing/monitoring routing within a routing area needed through which the above mentioned objects can be fulfilled.

Still further a method of managing/monitoring routing within a routing domain or in a routing area as referred to above is needed through which the above mentioned objects can be met.

Therefore an arrangement as referred to above is disclosed and there is one link state database for each routing area within the routing domain. A domain may of course comprise only one routing are as well. A link database is maintained by each network node of the routing area that each network node belongs to since each network node belongs to at least one routing area. For at least some of the routing areas a separate routing controlling device is provided such that a domain with a plurality of routing areas may comprise also a plurality of routing devices; and there may be one routing controlling device for each area but it is not necessarily the case. The numbers may also differ. Such routing controlling device belongs to the routing process of the respective routing area and it contains a copy of, preferably an identical copy of, the link state database of the routing area or areas and it is/are identical to the link state database of the network nodes of the respective area. Each routing controlling device is connected to a network node of the respective routing area it belongs to and the routing controlling device comprises means for rejecting non-routing information/traffic and for injecting routing information into the link state routing process respective routing area. More generally means are provided for preventing non-routing information from reaching the routing controlling devices, which only accept routing information (not traffic). Particularly there is one routing controlling device for each routing area. In an alternative embodiment at least one routing controlling device belongs to more than one routing area. As referred to above, a routing domain may comprise more than one routing area. In a preferred implementation the means for injecting routing information comprises means for injecting a link state database records of the respective links state routing process into the link state process of the respective area or areas it belongs to. In a particular implementation a routing controlling device is only connected to one network node of the area it belongs to. However, it may also be connected to more than one network node of such area. It may also be connected to a network node belonging to more than one routing area or it may be connected to a routing device of each of more than one area.

In a preferred implementation the routing controlling device(s) monitor and/or manages updates/changes in the network nodes of the respecting routing areas. Particularly the routing controlling devices operate in such a manner that they simulate the network nodes of its routing area(s) through injecting messages to routing process(es) of the respective routing area(s) when there for example has been a change on a link connected to network node so that a message appears to be issued by said network node for purposes of fulfilling the used protocol, for example a standard protocol which require that the messages actually are issued by the network nodes themselves.

In a particular implementation the network is Internet. Then at least some of the network node comprise Internet routers. According to one embodiment the used link state routing protocol is then OSPF (Open Shortest Path First). The administrating means handling the routing domain as one single unit may be an Internet Service Provider (ISP).

Particularly the routing protocol comprises a link state update protocol and a link state acknowledgment protocol to ensure that all network nodes, particularly routers, within the routing area actually comprise the same link state database. The network nodes, or particularly the routers, particularly send so called link state acknowledgments, in short LSAs between each other and for each destination of a packet or a message, the network node or the router uses an algorithm to find the shortest path. Although here is mainly referred to a router, it may also be a switch or some other network node. The routing controlling device operates in such a manner that it transforms a network change, i.e. a change on a link to/from a network node, within its area (or within one of its areas) in case it is connected to more than one routing area, into LSA records particularly through manipulating LSA records in the link state database. The manipulated LSA records are then flooded throughout the respective routing area that is concerned (or which areas are concerned).

In a particular implementation the network is an ATM (Asynchronous Transfer Mode) network. In such a communication system the network nodes comprise switches and for example the PNNI (Private Network to Network Interface) link state protocol may be used.

Therefore also a device for controlling routing within a routing area of a routing domain provided. The routing area, as referred to above, comprises a number of network nodes which communicate via transmission links and link state routing is implemented in the area. The network nodes may comprise Internet routers or switches of an ATM communication system. Each network node comprises a link state database which is the same for all nodes within the same routing area, i.e. it is assured that it is the same and the same information is comprised in every network node. The routing controlling device comprises a copy of the link state database of the routing area, i.e. it is identical to the link state databases of the network nodes. The routing controlling device may be provided for one or more than one area. Means for rejecting non-routing information to the routing controlling means are provided. Moreover means are provided for injecting routing information into the link state routing process of the area. This means that the device only handles routing information (and thus not the traffic to be routed like other network nodes do) and it is connected to at least one network node. The routing controlling device may also be connected to a network node which via transmission links is connected to network nodes in for example two areas. Such routing controlling device may also be connected to for example two network nodes within one and the same routing area.

Particularly the means for injecting routing information injects transformed link state database records into the link state routing process. Particularly the network controlling device simulates the network nodes of its routing area(s) through injecting messages or database records when there for example has been a change on a transmission link such that the message actually appears to be issued by the concerned network node that is connected to the transmission link since known protocols require that the network nodes actually emit the messages. This can be provided for in different manners. Particularly the device is used for monitoring and/or handling or managing updates/changes concerning the network nodes of the its area(s).

Therefore also a method of controlling routing in a routing area of a routing domain, wherein the routing area comprises a number of network nodes, is provided which implements link state routing. The method comprises the steps of; providing a routing controlling device for the routing area which only handles information messages relating to routing; providing a copy of the link state database as provided in each network node of the routing area also in the routing controlling device so that the device forms part of the routing process of the routing area; providing information to the routing controlling means relating to updates/changes within the routing area; transforming the updated/new information into link state acknowledgments (link state database records) in the routing controlling device; sending the link state database records (new LSA:s) to the network nodes within the routing area from the routing controlling device/flooding the updated information into the routing area and updating the link state databases.

Particularly the method comprises the steps of; controlling more than one routing area from one routing controlling device; maintaining a copy of the link state database of each routing area controlled by the routing controlling device in the routing controlling device; providing the network nodes of the respective area with the updated information of the respective area through sending LSA:s of the respective routing area to the network nodes of the appropriate area.

Routing monitoring/management according to the present invention may particularly be used for routing different types of traffic as disclosed in the copending patent application "An arrangement, a system and a method for routing traffic in a network" filed by the same applicant and at the same day as the present application, which herewith is incorporated herein by reference. The invention disclosed herein is based on separation of IP traffic in a routing domain.

It is an advantage of the invention that not each network node has to be contacted or communicated with for management/monitoring when a change or an update takes place etc. which has as a consequence that bandwidth as well as CPU power can be saved for the network nodes. It is also an advantage of the invention that routing management gets fast and efficient and that the same procedure can be used irrespectively of kind of network node, particularly irrespectively of network manufacturer.

BRIEF DESCRIPTION OF THE DRAWINGS

The invention will in the following be further described in a non-limiting way and with reference to the accompanying drawings in which.

DETAILED DESCRIPTION

With reference to the accompanying drawings monitoring and management of a link state routing domain will now be more thoroughly described through exemplifying illustrations. The network nodes using link state routing protocols use identical copies of the link state database of respective area to compute the optimum paths that are associated with its location within the network or particularly within the routing domain. The fact that the link state database is common to or the same for all the network nodes allows monitoring and management to be performed faster than by hitherto known methods and, as referred to above, it also saves bandwidth and CPU power in the network and particularly in the respective network nodes. Link state routing protocols rely on a concept of using identical, distributed topology maps, or links databases of a so called routing domain. Such an approach allows the quick recalculation of routes due topological changes. Furthermore the link state routing protocols require less routing protocol traffic as compared to distance vector routing protocols. In brief a link state database routing protocol operates such that each network node creates a link state advertisement, in the following denoted LSA which includes its identity and working interfaces. The LSAs (one from each network node) are the constituents forming the link state database. Depending on different link state routing protocols, different information is included within the LSAs. The LSAs originating from all network nodes are flooded throughout the network and the link state database is built up of all LSAs. An algorithm is then applied to the link state database such that each network node will get its own routing table according to its location within the network. An example on such an algorithm is Dijkstra's Shortest Path First. Of course also other appropriate algorithms can be used such as for example the Bellman-Ford algorithm (used with e.g. the Internet RIP distance vector routing protocol. However, it is generally advantageous to implement a more efficient algorithm such as SPF.

When monitoring the routing tables on each network node it is according to the invention not necessary to communicate directly with each network node since the table can be created using the link state database which is built up of all LSAs as discussed above. Thus, as long as the link state database is known, the computation can be performed using a stand-alone equipment that is connected to the network, i.e. using routing controlling devices as will be more thoroughly discussed with reference to the drawings. Thus, when managing the routing tables of the network, it is sufficient to insert new LSAs into the network. The description of the figures to follow below mainly relates to the Internet routing protocol, Open Shortest Path First (OSPF) e.g. version 2. However, the invention can be used with other link state routing protocols as well. An example thereon is the PNNI that is used in ATM networks. Also other alternatives are possible.

Figure 1:
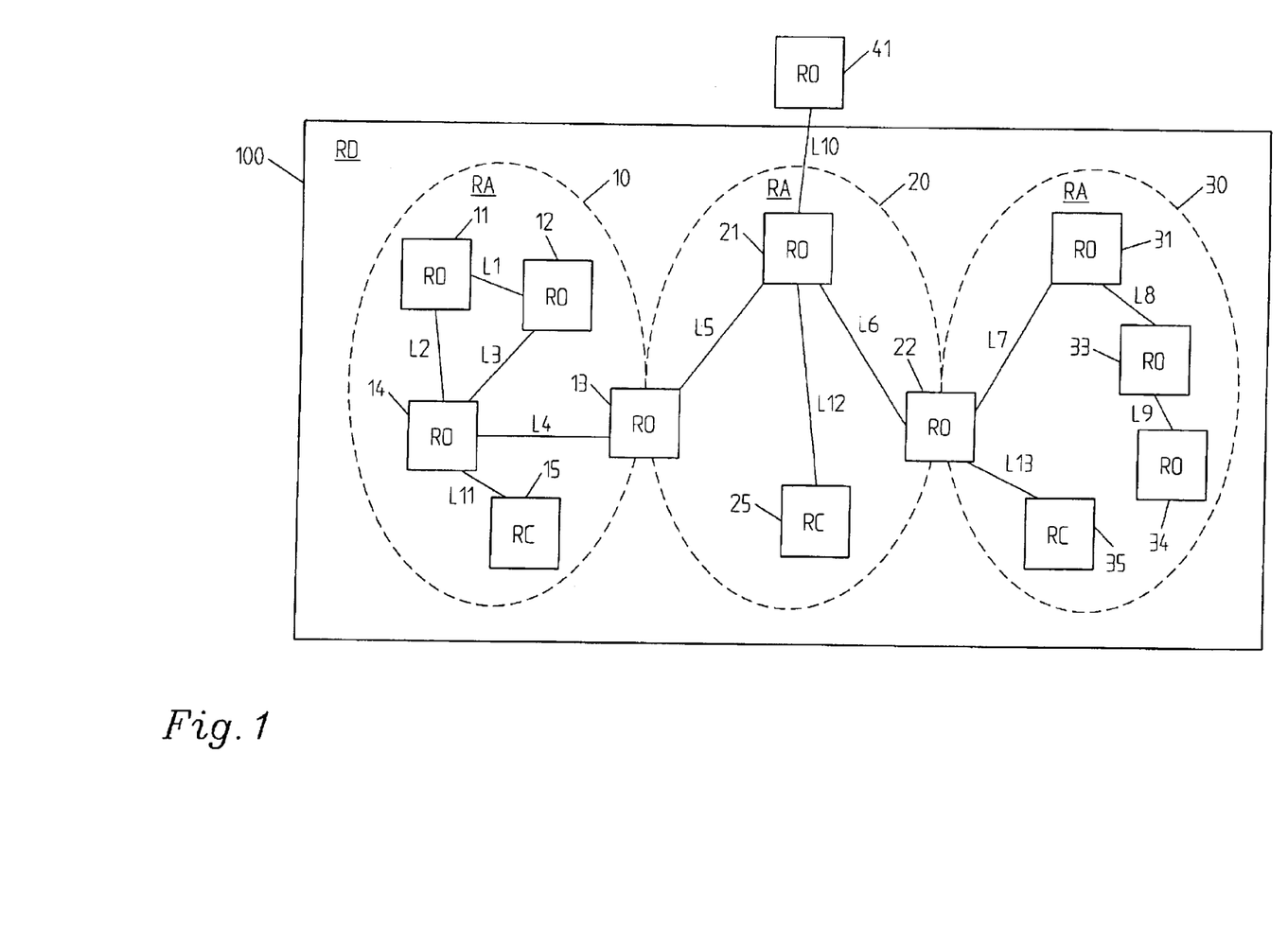
FIG. 1 shows an exemplary embodiment of the invention with a routing domain comprising a number of routing areas, FIG. 2 schematically illustrates the operation of a network node in the form of a router using OSPF, FIG. 3 schematically illustrates routers and links of one OSPF routing area, FIG. 4 schematically illustrates a link state database associated with the routing area as illustrated in FIG. 3.

FIG. 1 schematically illustrates one example on a routing domain RD 100 which comprises three routing areas RA 10, RA 20, RA 30 and it contains routers RO 11–15, RO 21,22,25, RO 31,33,34,35. In general a routing domain may comprise just one routing area or more or fewer routing areas than illustrated; it should be clear that FIG. 1 merely relates to one particular example. The domain can also be denoted an autonomous system and it is administrated as one single unit by for example an Internet Service Provider (ISP) (not shown). Router RO 41 is an external router and it belongs to another routing domain which is not illustrated in the figure. All the network nodes may comprise routers and they are connected via links with link identities link ID L1–10. OSPF is so designed that the domain can be split into different routing areas as referred to above. The domain may be split into different areas depending on the sizes of the link state databases, the generation of the route computation and the volume of routing messages which increases with the size of the network. Also other aspects may be considered. RA 10 and RA 30 are connected to RA 20 which is denoted a backbone area. Routers RO 11–15 belong to RA 10, RO 21,22,13 belong to RA 20 whereas ROs' 22,31,33,34 belong to RA 30 as can be seen from the Figure. ROs 13 and 22 belong to two routing areas each, namely RA 10,20 and RA 20,30 respectively. In the figure one routing controlling device RC 15,25,35 is provided in each of the routing areas RA 10,20,30 respectively.

In this embodiment each routing controlling device 15,25, 35 is only connected to one router in each routing area respectively. Of course the routing controlling devices may also be connected to more than one network node (router) in each area. Also other alternatives are possible. The number of network nodes within a routing area may of course also be different; there may be fewer as well as more routing devices within an area, the number of network nodes in a routing area may be the same throughout a routing domain but it may also differ from routing area to routing area. Any alternatives is in principle possible.

Figure 2:
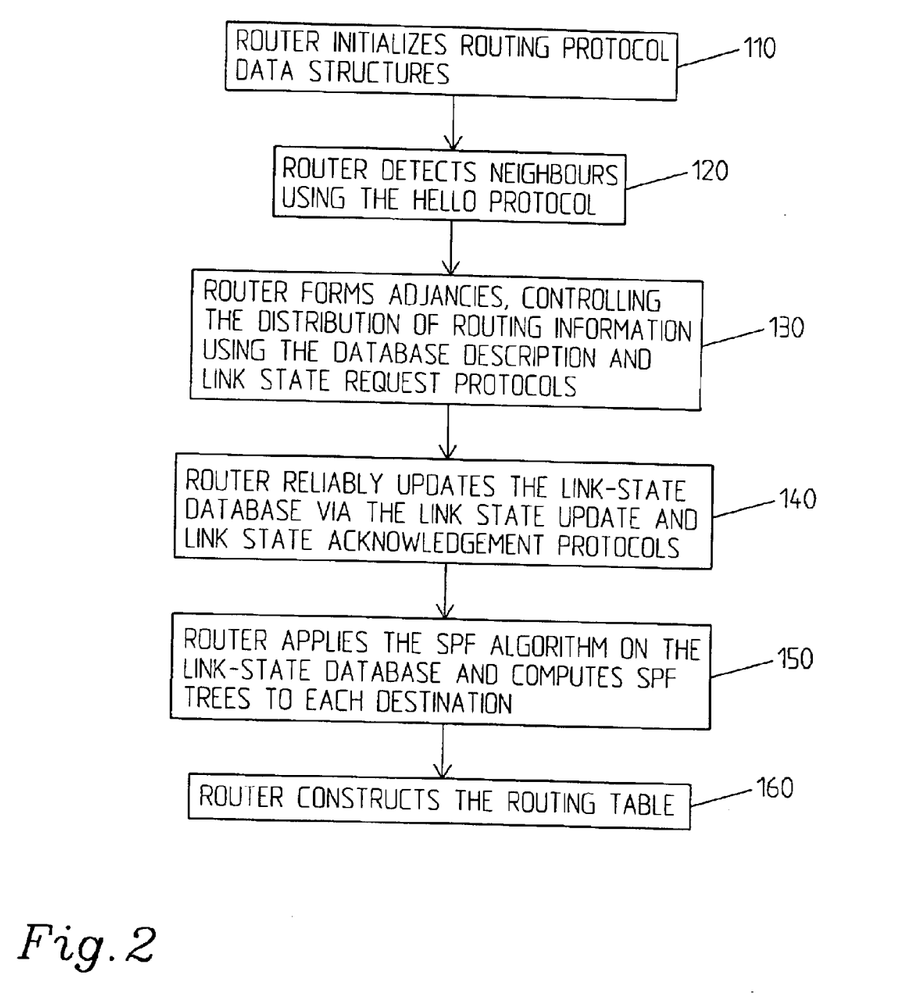

FIG. 2 is a flow diagram schematically illustrating the operation of a network node, particularly a router, using OSPF as is known per se. The relevant steps are illustrated and first the routers initializes the routing protocol data structures, 110. Then the router detects which are its neighbours using the "Hello" protocol, 120. Neighbours are routers having interfaces to a common network, sharing the same Internet network number and network mask. Thereupon adjacencies are formed and the distribution of routing information is controlled using the database description and Link State Request Protocols, 130. Adjacency or routers are neighbours that exchange routing information. Not all neighbours are adjacency routers.

Then the router updates the link state database via the Link State Update Protocol and the Link State Acknowledgment Protocol, 140. The router in this step thus advertises and receives states using the managed protocols. This step is reliable and ensures that all routers maintain the same link state database. The entity that the routers send among each other is denoted an LSA as referred to above. Thereupon the router applies the SPF (Shortest Path First) algorithm by Dijkstra on the link state database and computes the SPF trees to each destination or for each of the destinations.

Finally the router constructs the routing table using the obtain information, 160.

Figure 3:
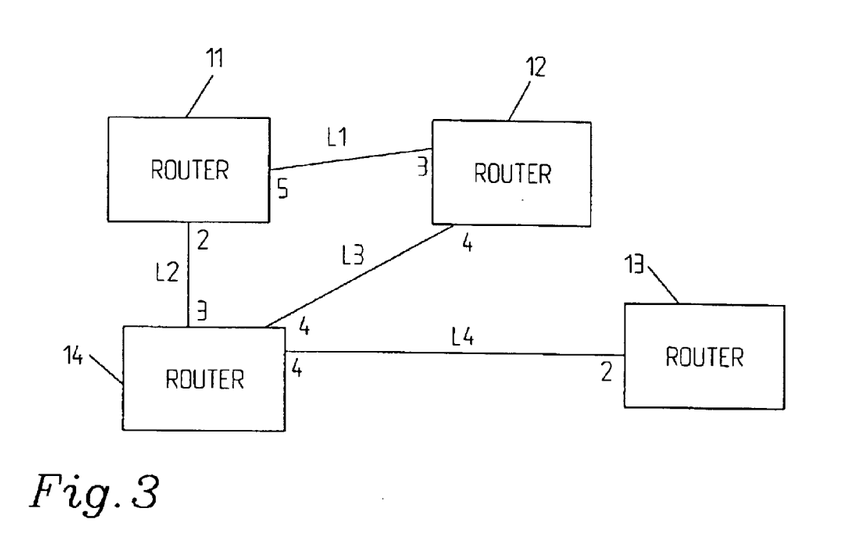
Figure 4:
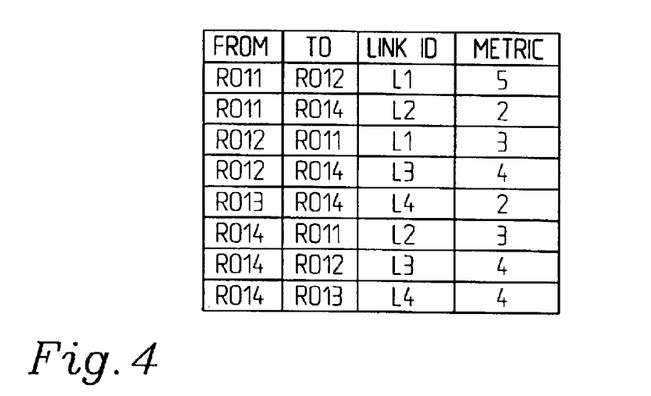
Figure 5:
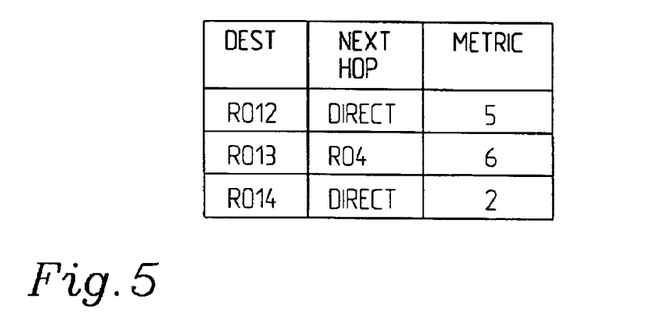
FIG. 5 illustrates an example of a routing table for one of the routers in FIG. 3.

In FIG. 3 the routers RO 11,12,13,14 of RA 10 of FIG. 1 are illustrated more in detail. It is here assumed that RO 13 is not connected to RA 20 for reasons of simplicity. Each interface is associated with a metric which is supplied to a packet leaving the router. The link state database is associated with RA 10 as illustrated in FIG. 4. The database comprises columns, namely from advertising router, to advertising router, link identity (link ID) and interface metric. Each record in the database originates from the one station that is responsible for it. In FIG. 5 the routing table for router RO 11 is illustrated once step 150 of the flow diagram of FIG. 2, which discloses use of the SPF algorithm, has been applied to the link state database of FIG. 4.

As referred to above there is one link state database for each routing area RA 10,20,30. This implies that the routers within a routing area all have an identical link state database. RO 13 is connected both to RA 10 and to the backbone area RA 20. As such it has to maintain two link state databases, namely one for RA 10 and one for RA 20. This is also the case for RO 22 which is connected both to RA 20 and RA 30. Routers RO 13 and RO 22 are therefore denoted area border routers. RO 21 is connected to an external routing domain and it is denoted a routing domain border router. RO 21 only maintains a link state database for RA 20. The other routers are denoted internal routers.

Returning to FIG. 1 the illustrated routing controlling devices RC 15,25,35 belong to the respective routing processes of the different areas RA 10, RA 20, RA 30. The routing controlling devices RC 15,25,35 maintain link state database(s) for each area that they belong to. Furthermore, as referred to above, each routing controlling device is connected to a network node or particularly to a router. Thus, in the illustrated embodiment RC 15 is connected to RO 14 via link L 11, RC 25 is connected to RO 21 via link L 12 and finally RC 35 is connected to RO 22 via link L 13. Means are provided such that the routing controlling devices do not handle any traffic but only information relating to routing. In this case are therefore the interface metrics from RO 14, RO 31 and RO 22 set high so that no packets, except from the routing information, will be routed to the routing controlling devices 15,25,35. The monitoring and management of a routing area using the routing controlling device according to the invention will no be more thoroughly described.

To monitor/manage a routing area it is, according to the present invention, sufficient to have knowledge of the link state database of that area. The reason therefore is that all routing tables can be computed from the link state database. A routing controlling device according to the present invention will be therefor allow for complete monitoring/managing of the routing area to which it belongs. It is an advantage that the scarce resource of CPU-cycles that are available within the network nodes, routers or switches or similar in the area will be saved. Actual management of a routing area can thus be carried out using a routing controlling device which forms part of the routing area when it has a copy of the link state database of the routing area.

Figure 6:
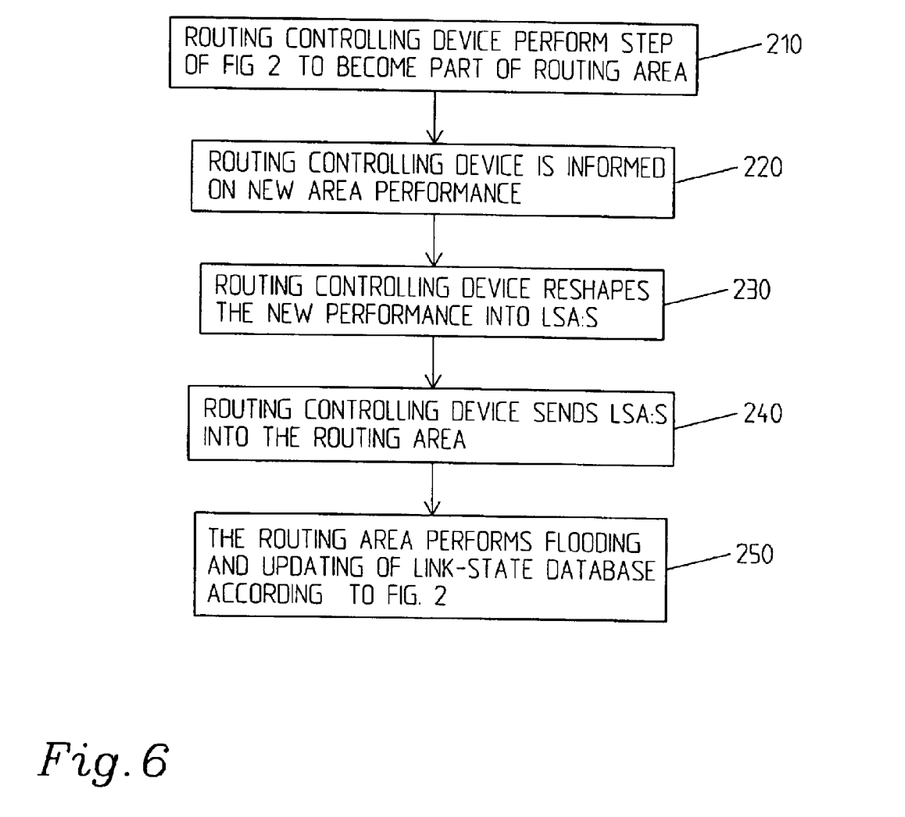
FIG. 6 is a flow diagram illustrating management of a routing area using a routing controlling device as disclosed in FIG. 1.

In the flow diagram of FIG. 6 management of a routing area using a routing controlling device is illustrated.

First the routing controlling device performs the steps as illustrated in FIG. 2 to become a part of the routing area, i.e. it can be said to join the routing area. An interface metric on the routing interface connected to the routing controlling device is set high such that no traffic is routed towards the routing controlling device, 210. Then the routing controlling device is informed on the new area performance, i.e. some kind of change, 220. This includes notion of a necessary network change, for example situations in which the ISP wishes to reroute traffic from a customer to a different area border router. (This however merely constitutes one particular example on a network change, the concept is valid for any change.) The information on the change in the network is then entered into the routing controlling device. Information about the network change may be triggered dynamically, for example via SNMP (Simple Network Management Protocol) traps originating within the network or by conscious action by a network administrator or in any other way.

Thereafter the routing controlling device reshapes or converts the desired network change into LSA records, 230. This may be done by manipulating the LSA records in the link state database until the desired network change takes place. This can also be done in other manners, the main thing being that the new or updated situation is converted into LSAs. To send new LSA records into the routing area from the routing controlling device, limited additional data structures and logic needs to be incorporated into the initialization process, 110, as referred to with reference to FIG. 2, such that the LSA records originating from the routing controlling device are not rejected by other internal routers (according to the protocol).

Finally is provided for flooding and updating of the link state database as discussed with reference to FIG. 2. That means that the new LSA records will be flooded throughout the area once this step is completed, all network nodes or routers within the area will then have an identical copy of the new link state database.

The principle remains the same for other network nodes and also if others than the explicitly mentioned link state routing protocols are used, the inventive concept is still valid.

Also in another aspect it should be clear that the invention is not limited to the particularly illustrated embodiments but that it can be varied in a number of ways.

What is claimed is:

1. An arrangement for monitoring and managing routing in a communications network comprising:
    at least one routing domain having at least one routing area that includes a plurality of network nodes that intercommunicate using transmission links;
    administrating means for administering the at least one routing domain using a link state routing protocol;
    at least one routing controlling device coupled to at least one network node of a routing area and part of a link state routing process for the routing areas to which the at least one network node belongs,
    a link state database maintained by the routing controlling device for computing an optimal transmission path between network nodes in the at least one routing domain means
    means for rejecting non-routing information and traffic presented at the at least one muting controlling device; and
    means for injecting routing information from the at least one routing controlling device into the link state routing process, for generating, at each of the network nodes that are part of the link state routing process, link state databases that are identical to the link state database maintained by the at least one routing controlling device.

2. The arrangement according to claim 1, wherein there exists a routing controlling device for each routing area.

3. The arrangement according to claim 1, wherein the at least one routing controlling device belongs to more than one routing area.

4. The arrangement according to claim 1, wherein a routing domain comprises more than one routing area.

5. The arrangement according to claim 1, wherein the means for injecting routing information injects link state database records of a respective link state routing process into the link state processes of all of the routing areas to which the at least one routing control device belongs.

6. The arrangement according to claim 1, wherein a routing controlling device is connected to only one network node of the routing areas to which the routing control device belongs.

7. The arrangement according to claim 1, wherein a routing controlling device is connected to more than one network node of the routing areas to which the routing control device belongs.

8. The arrangement according to claim 1, wherein the at least one routing controlling device monitors and manages updates and changes in the network nodes of the routing areas to which the at least one routing control device belongs.

9. The arrangement according to claim 1, wherein a routing controlling device simulates the network nodes of the routing areas to which the routing control device belongs when injecting messages into a routing process when a link change occurs, such that the messages appear to be issued by a network node for purposes of fulfilling a used protocol and such that the messages are accepted by the network nodes.

10. The arrangement according to claim 1, wherein the communications network is the Internet.

11. The arrangement according to claim 10, wherein at least one of the network nodes is a router.

12. The arrangement according to claim 11, wherein the link state routing protocol is Open Shortest Path First.

13. The arrangement according to claim 10, wherein the administrating means is an Internet Service Provider.

14. The arrangement according to claim 10, wherein the link state routing protocol comprises a link state update protocol and a link state acknowledgment protocol for ensuring that all network nodes within a routing area have the same link state database, that the network nodes send Link State Acknowledgments (LSA) to each other, and that the network nodes employ an algorithm to determine a shortest path through the network for transmitting packets and messages.

15. The arrangement according to claim 14, wherein the at least one routing controlling device transforms a network change within a corresponding routing area into LSA records by manipulating LSA records in the link state database, the manipulated LSA records then being flooded throughout the respective routing areas.

16. The arrangement according to claim 1, wherein the communications network is an ATM network, the network nodes include switches, and the link state protocol is a Private Network to Network Interface.

17. A routing controlling device for controlling routing within at least one routing area of a routing domain and being part of a link state routing process, the at least one routing area having a plurality of network nodes intercommunicating using transmission links, each network node having a link state database which is the same for all network nodes within the routing area, the routing controlling device comprising:
    a link state database which is identical to each link state database of the network nodes;
    means for preventing non-routing information from being transmitted to the routing controlling device; and
    means for injecting routing information into the link state routing process;
    wherein the routing device only processes muting information and is connected to at least one network node within the routing area.

18. The device according to claim 17, wherein the routing controlling device controls the routing in a plurality of routing areas and includes a link state database corresponding to each of the routing areas.

19. The device according to claim 17, wherein the means for injecting routing information injects transformed link state database records into the link state routing process of the routing area.

20. The device according to claim 19, wherein the device simulates the network nodes of the corresponding routing areas by injecting messages and database records when there exists a change on a transmission link such that the messages appear to be issued by a network node connected to the transmission link.

21. The device according to claim 17, wherein the device monitors and manages updates and changes in the network nodes.

22. A method of controlling routing in at least one routing area of a routing domain, the at least one routing area having a plurality of network nodes, the method comprising the steps of:
    implementing a link state muting process in the at least one routing area;
    providing a routing controlling device for the at least one muting area that only processes information messages relating to muting;

providing a link state database in the routing controlling device identical to a link state database in each of the network nodes of the at least one muting area, such that the device forms part of the routing process;

providing information to the routing controlling device relating to updates and changes within the at least one muting area;

transforming updated and new information into Link State Acknowledgments (LSA) records in the routing controlling device;

sending the LSA records to the network nodes within the at least one routing area from the routing controlling device; and flooding the updated and new information into the at least one routing area and updating the link state databases based upon the LSA records.

23. The method of claim 22, further comprising the steps of:

controlling a plurality of routing areas from a routing controlling device;

maintaining a link state database for each of the corresponding routing areas in the routing controlling device; and providing the network nodes of a first routing area with the updated information of at least one other routing area by sending LSA records of at least one other routing area to the network nodes of the first routing area.

* * * * *

UNITED STATES PATENT AND TRADEMARK OFFICE
CERTIFICATE OF CORRECTION

PATENT NO. : 6,823,395 B1  Page 1 of 1
APPLICATION NO. : 09/661625
DATED : November 23, 2004
INVENTOR(S) : Adolfsson It is certified that error appears in the above-identified patent and that said Letters Patent is hereby corrected as shown below:

In Column 9, Line 23, in Claim 1, delete "domain means" and insert -- domain; --, therefor.

In Column 9, Line 25, in Claim 1, delete "muting" and insert -- routing --, therefor.

In Column 10, Line 39, in Claim 17, delete "muting" and insert -- routing --, therefor.

In Column 10, Line 63, in Claim 22, delete "muting" and insert -- routing --, therefor.

In Column 10, Line 66, in Claim 22, delete "muting" and insert -- routing --, therefor.

In Column 10, Line 67, in Claim 22, delete "muting" and insert -- routing --, therefor.

In Column 11, Line 3, in Claim 22, delete "muting" and insert -- routing --, therefor.

In Column 11, Line 7, in Claim 22, delete "muting" and insert -- routing --, therefor.

Signed and Sealed this

Thirtieth Day of October, 2007

JON W. DUDAS
*Director of the United States Patent and Trademark Office*